2,954,326

STEROID PRODUCTION WITH DACTYLIUM DENDROIDES

William J. McAleer, Roselle, and Thomas H. Stoudt, Westfield, N.J., assignors to Merck & Co., Inc., Rahway, N.J., a corporation of New Jersey No Drawing. Original application Nov. 22, 1957, Ser. No. 698,061. Divided and this application May 26, 1958, Ser. No. 737,549

4 Claims. (Cl. 195—51)

This application is a division of our copending application Serial No. 698,061, filed November 22, 1957, now abandoned.

This invention is concerned generally with novel steroid compounds and with processes of preparing the same. More particularly, it relates to novel 16α-alkyl-11α,17α-dihydroxy-4-pregnene-3,20-dione and to the process of preparing these compounds starting with 16α-alkyl-4-pregnene-3,20-dione.

The novel 16-alkyl-11α,17α-dihydroxy-pregnene-3,20-dione compounds prepared in accordance with this invention, can be readily converted to 16α-alkyl-17α,21-dihydroxy-4-pregnene-3,11,20-trione and 16α-alkyl-11β,17α,21-trihydroxy-4-pregnene-3,20-dione, compounds possessing extremely high anti-inflammatory activity and especially effective for the treatment of arthritis and related diseases.

In preparing the novel chemical compounds of the present invention, we utilize as the starting material, the known compound, 16α-alkyl-4-pregnene-3,20-dione having the following structural formula—

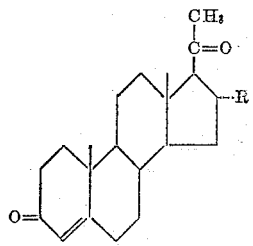

wherein R is alkyl.

In accordance with the present invention this starting material, namely, 16α-alkyl-4-pregnene-3,20-dione, is subjected to the action of an oxidizing enzyme produced by an oxygenating strain of *Dactylium dendroides* under aerobic conditions to form 16α-alkyl-11α,17α-dihydroxy-4-pregnene-3,20-dione, a compound having the following structural formula—

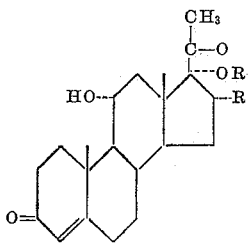

wherein R is as above.

The 16α-alkyl-11α,17α-dihydroxy-4-pregnene-3,20-dione obtained above may be brominated at the 21-position with bromine and chloroform to form 16α-alkyl-21-bromo-11α,17α-dihydroxy-4-pregnene-3,20-dione. Upon reacting the latter compound with potassium acetate 16α-alkyl-11α,17α,21-trihydroxy-4-pregnene-3,20-dione 21-acetate is formed. This latter compound is readily oxidized with sodium dichromate in acetic acid to 16α-alkyl-17α,21-dihydroxy-4-pregnene-3,11,20-trione.

The 16α-alkyl-17α,21-dihydroxy-4-pregnene-3,11,20-trione can be converted to te bis-semicarbazone, reduced with sodium borohydride and upon hydrolysis of the semicarbazone 16α-alkyl-11β,17α,21-trihydroxy-4-pregnene-3,20-dione is formed.

It has been found that both 16α-alkyl-11α,17α-dihydroxy-4-pregnene-3,20-dione and 16α-alkyl-11β,17α-21-trihydroxy-4-pregnene-3,20-dione possess extremely high anti-inflammatory activity.

In carrying out the process of the present invention, strains of *Dactylium dendroides* capable of affecting the oxygenation of 16α-alkyl-4-pregnene-3,20-dione can be obtained from known culture collections. For example, one such culture, *Dactylium dendroides* No. NRRL 2574 can be obtained from Northern Regional Research Laboratories, Peoria, Illinois. The microorganism is grown under aerobic conditions in a suitable nutrient medium in intimate contact with the 16α-alkyl-4-pregnene-3,20-dione to be oxygenated; the fermentation or growing of the microorganism being continued until the desired oxygenation has occurred. Thus, the 16α-alkyl-4-pregnene-3,20-dione to be oxygenated can be incorporated directly in a suitable medium which is then inoculated with an oxygenating strain of *Dactylium dendroides* and incubated under aerobic conditions thereby effecting the desired oxygenation. Generally, our process is preferably effected by first growing the microorganism in a suitable fermentation medium, then adding the 16α-alkyl-4-pregnene-3,20-dione and continuing the cultivation of the microorganism under aerobic conditions for sufficient time to effect the desired oxygenation.

The process of the present invention can be effected in both stationary and submerged cultures of *Dactylium dendroides* growing under aerobic conditions, although, for practical purposes, it is most conveniently carried out by growing the microorganism under submerged conditions in a suitable aqueous fermentation medium containing the steroid. The amount of the steroid which can be conveniently oxygenated by our method will depend in part upon the particular medium employed.

Aqueous nutrient mediums suitable for the growing of oxygenating strains of *Dactylium dendroides* must contain sources of assimilable carbon and nitrogen as well as minor amounts of inorganic salts. Any of the usual sources of assimilable carbon such as dextrose, cerelose, glucose, inverted molasses, and the like, employed in fermentation mediums can be used in carrying out the process of our invention. Similarly, complex sources of nitrogen usually employed in commercial fermentation processes such as lactalbumin digest ("Edamin") and corn steep liquor, or an inorganic source of nitrogen such as sodium nitrate, ammonium nitrate, and the like, are satisfactory for use in the fermentation mediums. Minor amounts of inorganic salts such as suitable soluble salts of magnesium, potassium, sodium and iron are usually available in complex sources of carbon and nitrogen or may be conveniently added to the fermentation medium in minor amounts to promote maximum growth of the oxygenating microorganism.

The following is an example of a suitable aqueous nutrient medium which can be used in our process of oxygenating steroids:

MEDIUM NO. 1

| | |
|---|---:|
| Dextrose | 50.0 |
| $(NH_4)_2HPO_4$ | 7.5 |
| $K_2HPO_4$ | 1.0 |
| KCl | 0.5 |
| $MgSO_4 \cdot 7H_2O$ | 0.5 |
| $FeSO_4 \cdot 7H_2O$ | 0.001 |
| $ZnSO_4 \cdot 7H_2O$ | 0.01 |

Distilled water is added to give a total volume of 1 liter of nutrient medium and the pH adjusted to 6.5 with sodium hydroxide.

The addition of minor amounts of anti-foaming agents, although not essential, is desirable with some fermentation mediums in order to obtain maximum yields of the desired oxygenated product. We have found that the addition to certain fermentation mediums of a substituted oxazaline which is a nonvolatile, amine type, cationic surface active agent available under the trade name Alkaterge C is particularly effective in reducing the amount of foam, although other anti-foam agents known to be useful for this purpose can also be used.

For example, 16α-methyl-4-pregnene-3,20-dione can be oxygenated in accordance with the following procedure:

A sterile culture medium, such as those shown above is first inoculated by introducing a small amount of spore suspension on vegetative growth of an oxygenating strain of Dactylium dendroides. The inoculated nutrient medium is then incubated at a temperature of about 27–28° C., while being agitated in the presence of oxygen for a period of about 24–48 hours. At this point, a solution of 16α-methyl-4-pregnene-3,20-dione in propylene glycol is added to the fermentation medium and the agitation and aeration of the nutrient medium continued for about 5 to 30 hours, or until the oxygenation reaction is completed.

When the oxygenation is complete, the oxygenated steroid may be recovered from the fermentation broth by extraction with a suitable water immiscible organic solvent for the oxygenated steroids. Suitable solvents for this purpose that might be mentioned are chloroform, methylene chloride, organic acid esters, aromatic hydrocarbons, and the like. The solvent solution containing the desired oxygenated steroid can then be evaporated to yield the desired product which may be further purified by recrystallization or other procedures conventional in the art.

The 16α-alkyl-11α,17α-dihydroxy-4-pregnene-3,20-dione obtained above may be brominated at the 21-position with bromine and chloroform to form 16α-alkyl-21-bromo-11α,17α-dihydroxy-4-pregnene-3,20-dione. Upon reacting the latter compound with potassium acetate 16α-alkyl-11α,17α,21-trihydroxy-4-pregnene-3,20-dione 21-acetate is formed. This latter compound can then be oxidized with sodium dichromate in glacial acetic acid to form 16α-alkyl-17α,21-dihydroxy-4-pregnene-3,11,20-trione.

The 16α-alkyl-17α,21-dihydroxy-4-pregnene-3,11,20-trione can be converted to the bis-semicarbazone, reduced with sodium borohydride and upon hydrolysis of the semicarbazone 16α-alkyl-11β,17α,21-trihydroxy-4-pregnene-3,20-dione is formed.

The following examples illustrate methods of carrying out the process of the present invention.

*Example 1*

Approximately 3.2 liters of nutrient medium No. 1 shown above and the minimum quantity of a substituted oxazaline (Alkaterge C) required to prevent foaming was sterilized for ½ hour at 100° C. After sterilization the medium was inoculated with approximately 250 ml. of a vegetative growth of an oxidizing strain Dactylium dendroides culture NRRL 2574 in the collection of the Northern Regional Research Laboratories, Peoria, Illinois. The mixture was then agitated using a 2 turbine type agitator at 560 r.p.m. and air was passed in at a rate of 3 liters per minute maintaining the temperature at 28° C. for a period of approximately 24 hours.

At the end of the 24 hour period 1.28 g. of 16α-methyl-4-pregnene-3,20-dione dissolved in 160 ml. propylene glycol was added to the fermented medium and agitation of the medium was continued at the same. Aeration of the medium was continued at 3.01/minute for six hours and then interrupted for six hours. This procedure was continued for a period of thirty-six hours following addition of the steroid.

Crystalline 11α,17α-dihydroxy-16α-methyl-4-pregnene-3,20-dione was isolated from the fermented medium by extraction with ethyl acetate evaporation of the organic solvent in vacuo and recrystallization of the residual material from ethyl acetate.

It should be understood that various changes may be made in the present process as herein described without affecting the results attained. Thus, various modifications of conditions as to time, temperature, alkalinity, acidity, etc. and various changes in procedure differing from those herein given as illustrative of the preferred embodiments of this invention may be made without departing from the scope thereof. Accordingly, the scope of this invention is to be determined in accordance with the prior art and the appended claim.

We claim:

1. The process for the production of 16α-alkyl-11α,17α-dihydroxy-4-pregnene-3,20-dione which comprises subjecting 16α-alkyl-4-pregnene-3,20-dione to the action of an oxidizing enzyme produced by an oxygenating strain of Dactylium dendroides (NRRL 2574) under aerobic conditions.

2. The process for the production of 16α-methyl-11α,17α-dihydroxy-4-pregnene-3,20-dione which comprises subjecting 16α-methyl-4-pregnene-3,20-dione to the action of an oxidizing enzyme produced by an oxygenating strain of Dactylium dendroides (NRRL 2574) under aerobic conditions.

3. A process which comprises growing an oxygenating strain of Dactylium dendroides (NRRL 2574) in an aqueous medium containing sources of assimilable carbon and nitrogen under aerobic submerged conditions in intimate contact with 16α-alkyl-4-pregnene-3,20-dione to produce 16α-alkyl-11α,17α-dihydroxy-4-pregnene-3,20-dione.

4. A process which comprises growing an oxygenating strain of Dactylium dendroides (NRRL 2574) in an aqueous medium containing sources of assimilable carbon and nitrogen under aerobic submerged conditions in intimate contact with 16α-methyl-4-pregnene-3,20-dione to produce 16α-methyl-11α,17α-dihydroxy-4-pregnene-3,20-dione.

References Cited in the file of this patent

UNITED STATES PATENTS

| | | |
|---|---|---|
| 2,602,769 | Murray | July 18, 1952 |
| 2,762,747 | Murray | Sept. 11, 1956 |
| 2,844,513 | Wettstein et al. | July 22, 1958 |

OTHER REFERENCES

Meister et al.: J.A.C.S., 76, Aug. 3, 1954, pages 4050 and 4051.